A. T. MARTIN, Jr.
WHIFFLETREE-COUPLING.
No. 182,124.                  Patented Sept. 12, 1876.
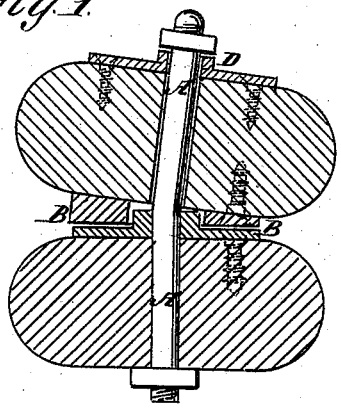
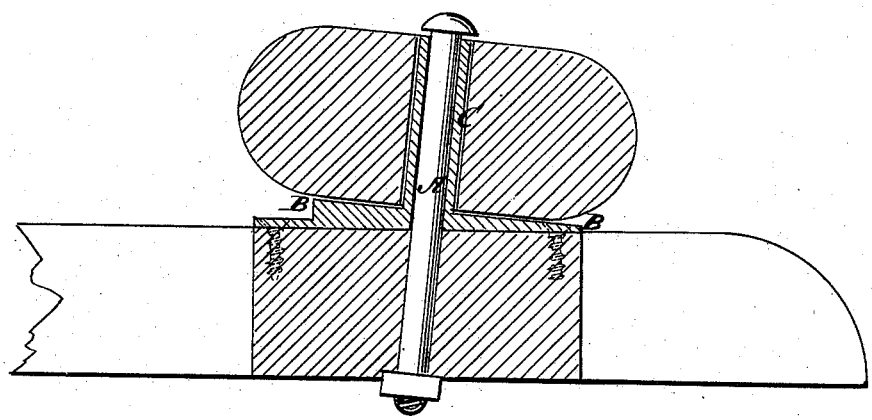

UNITED STATES PATENT OFFICE.

ASA T. MARTIN, JR., OF WAVERLY, IOWA.

IMPROVEMENT IN WHIFFLETREE-COUPLINGS.

Specification forming part of Letters Patent No. 182,124, dated September 12, 1876; application filed April 25, 1876.

*To all whom it may concern:*

Be it known that I, ASA T. MARTIN, Jr., of Waverly, Bremer county, State of Iowa, have invented a new and Improved Coupling for Whiffletrees and Double-Trees, of which the following is a specification:

Figure 1 is a detail section of my improved coupling, and Fig. 2 is a detail section of a modified form of the same.

The object of my invention is to furnish an improved coupling for connecting whiffletrees with the double-tree, and the double-tree with the tongue, which shall be so constructed as to prevent them from tipping or turning over; which will cause the end that moves forward to rise, so that it will return to its place; and which shall be strong, durable, and safe.

The invention will first be described in connection with the drawing, and then pointed out in the claim.

In the accompanying drawing, A represents the coupling-bolt, which is rigidly attached to a washer, B, and is bent at an angle at its point of intersection with said washer. The washer B is attached to the double-tree, through which the lower part of the bolt A passes, the upper part of the said bolt passing through the whiffletree.

The washer B may be made in two parts, one being attached to the double-tree, and the other to the whiffletree, as shown in Fig. 1, or in one piece, as shown in Fig. 2.

The washer B is made thicker upon one side than at the other, as shown in Figs. 1 and 2, to counterbalance the angle of the bolt A, and give the whiffletree a firm seat.

When the washer B is made in two parts, both parts of the bolts can pass through the whiffletree and the double-tree at right angles with their planes. When the washer B is made in one piece, the lower part of the bolt A may pass through the double-tree at an angle with its plane, as shown in Fig. 2.

The washer B may have a tube, C, formed upon it, to pass through the whiffletree, and through which the bolt A passes.

The whiffletree may have a washer, D, attached to its upper side, as shown in Fig. 1.

It is immaterial whether the coupling be used for connecting a whiffletree with a double-tree, or a double-tree with a tongue, the effect being the same in both cases.

I am aware that a socket for connecting the double-tree to the draft-rod of a reaper or mower has been heretofore made in two parts, one fitting each of them, and the whole adapted so that the ordinary guide or stay-chains may be rendered unnecessary.

Having thus described my invention, what I claim as new, and desire to secure by Letters Patent, is—

The combination of bolt A, inclined toward its center, and washer B, inclined on its upper surface, substantially as shown and described, for the purpose specified.

ASA T. MARTIN, JR.

Witnesses:
W. V. LUCAS,
J. C. HODGES.